(12) United States Patent
Devanagondi et al.

(10) Patent No.: US 7,289,537 B1
(45) Date of Patent: Oct. 30, 2007

(54) SINGLE-CHIP MULTI-PORT ETHERNET SWITCH

(75) Inventors: Harish R. Devanagondi, Saratoga, CA (US); Harish P. Belur, Saratoga, CA (US); Brian A. Petersen, San Francisco, CA (US)

(73) Assignee: Greenfield Networks, Inc., Sunnyvale, CA (US)

( * ) Notice: Subject to any disclaimer, the term of this patent is extended or adjusted under 35 U.S.C. 154(b) by 899 days.

(21) Appl. No.: 10/700,385

(22) Filed: Nov. 3, 2003

Related U.S. Application Data (60) Provisional application No. 60/423,194, filed on Nov. 1, 2002.

(51) Int. Cl.
*H04J 3/24* (2006.01)

(52) U.S. Cl. .................. 370/474; 370/412; 370/419; 370/442

(58) Field of Classification Search .............. 370/389, 370/474, 392, 412, 419, 442
See application file for complete search history.

(56) References Cited

U.S. PATENT DOCUMENTS

| | | | |
|---|---|---|---|
| 5,905,725 A | 5/1999 | Sindhu et al. .............. | 370/389 |
| 6,160,819 A | 12/2000 | Partridge et al. .......... | 370/474 |
| 6,208,650 B1 * | 3/2001 | Hassell et al. ............. | 370/392 |

OTHER PUBLICATIONS

Bennett, Jon C. R., "Packet Reordering is Not Pathological Network Behavior," December 1999, pp. 789-798, vol. 7, No. 6, IEEE/ACM Transactions on Networking.

Adiseshu, Hari, Parulkar, Guru and Varghese, George, "A Reliable and Scalable Striping Protocol," 11 pages, Department of Computer Science, Washington University, St. Louis, MO, "The referenced paper is to appear in *Computer Communication Review*, a publication of ACM SIGCOMM, vol. 26, No. 4, Oct. 1996. ISSN #0146-4833," according to ACM SIGCOMM '96 paper retrieval site, Retrieved from the internet Jan. 15, 2003 <http://acm.org/sigcomm/sigcomm/sigcomm96/papers/adiseshu.html>, attached.

Shreedhar, M., Varghese, G., "Efficient Fair Queuing Using Deficit Round Robin", pp. 231-242, SIGCOMM '95, Cambridge, MA, U.S.A.

D. Shah and P. Gupta, "Fast incremental updates on Ternary-CAMs for routing lookups and packet classification," in Proc. of Hot Interconnects-8, Stanford, CA, USA, Aug. 2000.

\* cited by examiner

*Primary Examiner*—John Pezzlo
(74) *Attorney, Agent, or Firm*—Fenwick & West LLP (57) ABSTRACT

An architecture for a multi-port switching device is described having a very regular structure that lends itself to scaling for performance speed and a high level of integration. The distribution of packet data internal to the chip is described as using a cell-based TDM packet transport configuration such as a ring. Similarly, a method of memory allocation in a transmit buffer of each port allows for reassembly of the cells of a packet for storage in a contiguous manner in a queue. Each port includes multiple queues. The destination queue and port for a packet is identified in a multi-bit destination map that is prepended to the start cell of the packet and used by a port to identify packets destined for it. The architecture is useful for a single-chip multi-port Ethernet switch where each of the ports is capable of 10 Gbps data rates.

10 Claims, 9 Drawing Sheets

SINGLE-CHIP MULTI-PORT ETHERNET SWITCH

CROSS-RELATED APPLICATION

This application claims priority under 35 U.S.C. § 119(e) to U.S. provisional patent application, "Single-Chip Multi-Port Ethernet Switch," having a Ser. No. 60/423,194 and a filing date of Nov. 1, 2002, and which is hereby incorporated by reference in its entirety.

FIELD OF THE INVENTION

This invention relates to the field of packet switching devices, in particular Ethernet switching devices.

BACKGROUND

As communication networks scale up in terms of speed and capacity, packets being switched and routed through network nodes need to be processed at increasingly higher speeds, matching those of the communication network links. Additionally, the processing per packet is becoming more complex. For example, the processing involves not only determining the destination of the packet but the processing of security parameters of the packet. A switching device architecture such as that of an Ethernet switch must accommodate the ever increasing performance needed for next generation high-speed networking.

The switching device redirects each incoming packet on an ingress port to an egress port based on information in the packet header. The switch must accommodate packets of various byte-lengths while still meeting higher and higher speed requirements.

Data integrity is a concern as well. For example, prevention of a queue filling up and overflowing which would result in bits being dropped must be addressed in a switch architecture. In some architectures, the minimum buffer size used is the number of bits in a maximum sized packet to address this problem. This results in larger buffer sizes in which memory is not fully utilized.

One may also consider the case where a packet is split into several cells to reduce latency in the switch caused by large packets. The switch architecture must provide for reliable reassembly of the cells into its original packet. Switch architectures desire to process packets from ingress to egress in a manner that is fast and reduces the burden on buffering and the amount of information needed for reassembly.

SUMMARY OF THE INVENTION

The present invention provides one or more embodiments of a multi-port packet switching device comprising a plurality of port units communicatively coupled in a packet transport time division multiplexed (TDM) configuration. In one embodiment, the packet transport TDM configuration transports a packet in one or more cells of about equal size. A supervisor processor interface may also be coupled into the configuration with the plurality of ports. Each of the port units and the supervisor interface may be a packet source for ingress packets coming into the switching device, and each also may be a packet destination for egress of packets from the switching device. Each of the port units is communicatively coupled to an address lookup module in the switching device. Each port unit also has an external device interface which is preferably a physical layer interface. The external device interface has a receive portion and a transmit portion. The receive portion formats an ingress packet into cells of about equal size. The transmit portion retrieves a packet for egress from the head of the appropriate queue.

In one embodiment, each of the port units comprises a plurality of queues. In one embodiment, the queues are prioritized. The region of memory space, dedicated to each queue may be statically configured during system initialization. In another aspect of the invention, the address lookup module determines a multi-bit destination queue map for an ingress packet for use within the switching device. In one embodiment, this internal queue map comprises a group of bits for each packet destination. For a destination port, each group of bits includes at least one bit for each of its queues. In an example where the supervisor interface is coupled into the configuration, a supervisor processor is communicatively coupled to the supervisor interface. The supervisor processor similarly determines a multi-bit destination queue map for a packet it forwards to the supervisor interface. For the supervisor interface as a destination, the group of bits associated with it represent different functional characteristics. For example, the address look-up results may indicate that the address needs to be learned so the bit of the group for the supervisor interface indicating address learning is set.

In another aspect of the invention, each port unit comprises a transmit buffer communicatively coupled to a packet transport TDM controller for receiving from the configuration one or more cells of a packet destined for its port. In one example, for each queue of the transmit buffer, a transmit buffer manager allocates a data correlator such as a write pointer for each of the other packet sources in the TDM configuration. The transmit buffer manager further maintains a read pointer for each queue used for reading cells to be transmitted to the external device interface. The transmit buffer manager allocates a context of memory space for each packet source whose data is being stored in the transmit buffer. The write pointer for the associated packet source points to the memory context for the associated packet source. The manner in which memory space is allocated within the transmit packet buffer memory in this example provides the benefit of reassembling multiple packets simultaneously within the transmit packet buffer memory. In another embodiment, there is a single write pointer maintained for each of the other packet sources in the configuration for the transmit buffer as well as a corresponding single read pointer for each of the other packet sources.

In another aspect of the invention, each port unit further comprises a receive buffer for temporarily storing one or more cells on ingress. In one example, the receive buffer is shallow in the sense that it is just deep enough to accommodate lookup and TDM ring access latencies.

In one embodiment, the switching device is implemented as a single-chip comprising the plurality of port units and the supervisor interface coupled in a packet transport TDM configuration and the address module communicatively coupled to each port unit. In one example, the configuration is a ring configuration. In another example, the single-chip switching device is an Ethernet switching device capable of interfacing directly with physical layer devices and a supervisor processor subsystem.

DETAILED DESCRIPTION OF THE DRAWINGS

Figure 1:
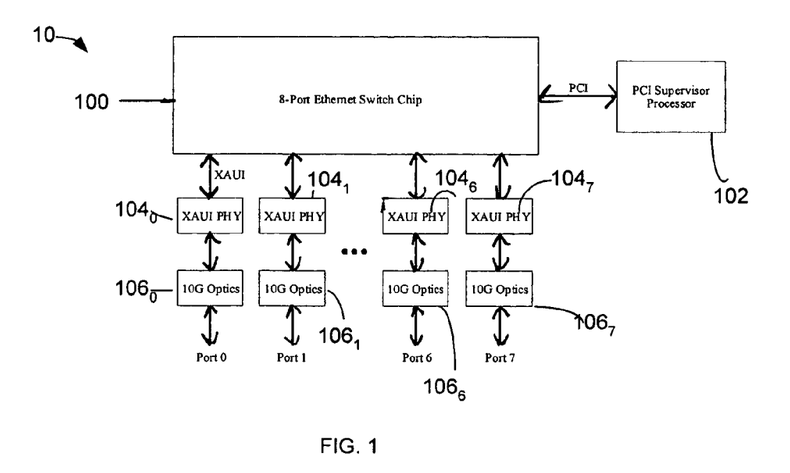
FIG. 1 illustrates a multi-port switching device as a single-chip system in accordance with an embodiment of the present invention in an example of a system environment context.

FIG. 1 illustrates a multi-port switching device 100 as a single-chip system 100 in accordance with an embodiment of the present invention in an example of a system environment 10 context. FIG. 1 illustrates an example of a multi-port switch device as a 10 Gbs Ethernet switch chip having eight ports. In this example, each port of the Ethernet switch chip 100 interfaces with a XAUI physical interface $104_0$ to $104_7$ for a 10 Gbps physical optical interface $106_0$ to $106_7$. The highly integrated, single chip system 100 interfaces over a PCI bus with an external PCI supervisor processor 102. In the illustrated example, the supervisor processor 102 depicted is not in the main packet data path. The functions of the supervisor include power-on self test, initialization, statistics gathering, exception processing and real-time configuration updates. The supervisor's interactions with the Ethernet switch chip may be done, for example, via a streamlined software API and highly tuned drivers.

Figure 2:
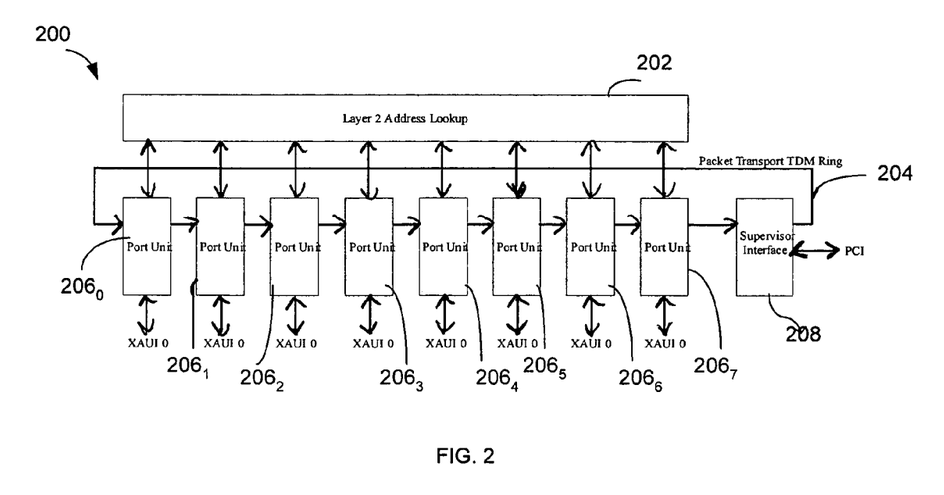
FIG. 2 illustrates an architecture of a multi-port switching device in accordance with an embodiment of the present invention.

FIG. 2 illustrates an architecture 200 of a multi-port switching device in accordance with an embodiment of the present invention. The architecture 200 is an example of an internal architecture that may be used by the single-chip Ethernet embodiment 100 illustrated in FIG. 1. The architecture comprises a cell-based packet transport time division multiplexed (TDM) ring 204 in which a plurality of port units $206_0$ to $206_7$ and a supervisor interface 208 are coupled. Other configurations, physical or logical, may be used, an example of which is a mesh or a linear chain configuration. The ring may allow unidirectional or bi-directional flow of data between the packet sources. Each of the port units $206_0$ to $206_7$ is communicatively coupled to an address lookup module 202, in this example a Layer 2 address lookup module 202. This illustrated internal architecture is very regular in its structure which lends itself to scaling beyond its initial performance goal of 80 Gbps in this eight port example.

In the example of FIG. 2, the packet transport TDM ring 204 is a simple, high bandwidth, slotted ring. Each port is provided with dedicated access time slots where a single cell of a packet may be deposited onto the ring and carried to its destination. For longer packets, multiple cells are transported by the ring where they are then reassembled within a transmit packet buffer (See discussion of a transmit buffer embodiment below for FIG. 3.)

Each of the port units $206_0$ to $206_7$ provides packet buffering services and occupies a single location on the Packet Transport TDM Ring. In the context of the single-chip Ethernet example of FIG. 1, each port provides Ethernet media access layer (MAC) interface services.

The supervisor interface unit or port 208 provides a supervisor processor (e.g. 102) with PCI access to internal registers and data structures (e.g. of the switch chip 100) and also to the transmit and receive capabilities on each port via the TDM transport.

The Layer 2 Address Lookup module 202 processes search arguments extracted from an ingress packet received by a port unit from an external device interface and returns a multi-bit destination queue map (See discussion of FIG. 4 below).

In the illustrated example, the supervisor processor interface 208 has full access to the packet transport TDM ring and, therefore, may transmit and receive packets via any of the device's depicted eight ports. For ingress packets received by the supervisor interface 208, from the supervisor processor 102, the supervisor processor 102 determines or formulates the multi-bit destination queue map for such packets and forwards the cells of these packets to the supervisor interface 208.

Each of the packet sources 208, $206_0$ to $206_7$ divides a packet for ingress onto the TDM ring into one or more cells of about equal size. In one example, an internal header for the packet is prepended to the packet (e.g. included in a first cell or designated start cell for the packet) prior to transmission onto the packet transport TDM ring. The internal header includes pertinent packet processing information, such as one or more of the following: the packet size or length (e.g. bytes), a packet position indicator such as a start of packet (SOP) indicator, an end of packet (EOP) indicator, or a middle of the packet indicator, the payload bytes of the cell, packet source, security parameters, a Time to Live (TTL) indicator, or a checksum, as well as the multi-bit destination queue map. The ingress packet is sent onto the TDM configuration to be transported to its destination. In the example of FIG. 2, as cells circulate around the ring, their embedded destination queue maps are examined by the supervisor interface port 208 and the port units $206_0$ to $206_7$ to determine whether it is the destination for each transported packet. If the queue map settings indicate the port is the destination, the cell is copied into the packet destination's transmit buffer. Once a cell returns to its packet source, it is stripped from the ring.

Figure 3:
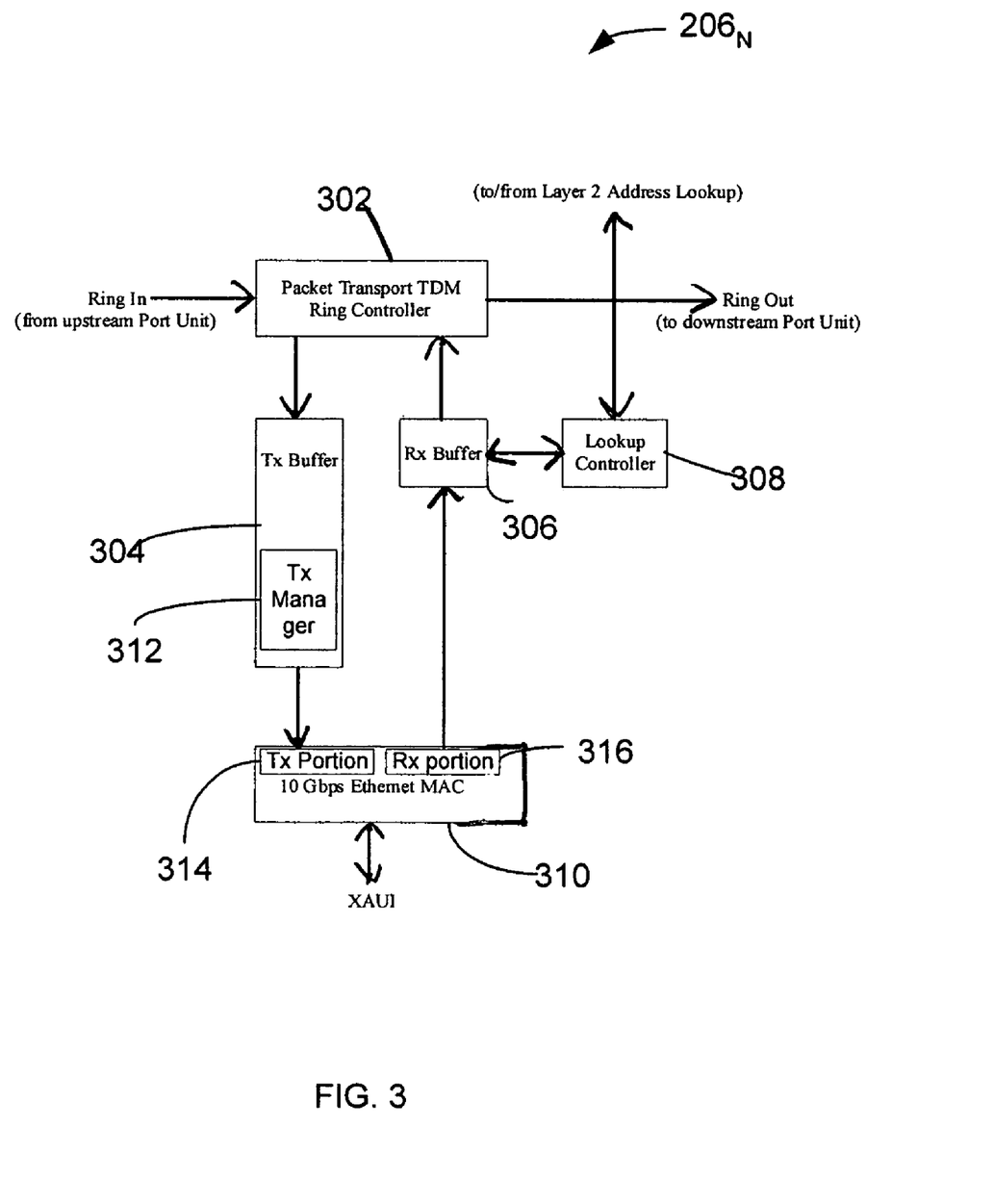
FIG. 3 illustrates a port unit of a multi-port switching device in accordance with an embodiment of the present invention.

FIG. 3 illustrates a port unit $206_N$ of a multi-port switching device in accordance with an embodiment of the present invention. FIG. 3 illustrates an example of a port unit $206_N$ that may be identically replicated in port units of a switching device such as one having the architecture illustrated in FIG. 2 or the single-chip device 100 of FIG. 1. The port unit $206_N$ comprises an external device interface 310 including a transmit portion 314 and a receive portion 316, implemented in this embodiment as a full-duplex 10 Gbps Ethernet MAC core, a transmit (Tx) buffer 304, a transmit buffer manager unit 312, a receive (Rx) buffer 306, a lookup controller 308, and a packet transport TDM configuration controller 302, implemented in this embodiment as a ring controller 302. The 10 Gbps Ethernet MAC interface 310 is coupled to receive an ingress packet from a physical interface, for example, the XAUI physical device interface. The receive portion 316 of the external device interface 310 formats the incoming packet into cells and is communicatively coupled to the receive buffer 306 for forwarding the one or more cells of the ingress packet for temporary buffer storage. An example of a cell size is 512 bits for payload plus additional bits for header information.

In this example, the receive buffer 306 is shallow in the sense that it is just deep enough to accommodate lookup and ring access latencies. In one example, the receive buffer may have a size of 2 Kbytes to approximately 9 Kbytes. A significant benefit of a cell-oriented TDM ring or other configuration is that the bandwidth requirements of the receive memory are reduced in that the memory need not burst the entire packet onto the ring at the ring's very high bandwidth. Rather, a single, relatively small cell is delivered at a time and the ring's time slots are spaced such that bandwidth required of the receive buffer memory 306 is limited. For example in the illustrated example of FIG. 2 with the eight ports and a 10 Gbps interface, the receive buffer memory 306 is limited to approximately 20 Gbps (twice the network's bandwidth) as opposed to the 160+ Gbps which the ring is able to convey.

The receive buffer 306 is communicatively coupled to a lookup controller 308 which extracts search parameters or arguments from the received packet, in this example, Layer 2 information, which it provides through a communication interface to the address lookup module, for example the Layer 2 address lookup module 202 of FIG. 2, for submission for lookup processing in its internal address tables. Examples of layer 2 information are the destination address, source address, virtual LAN identification (VLAN ID) and port number. The lookup result is returned in the form of a multi-bit queue map.

Figure 4:
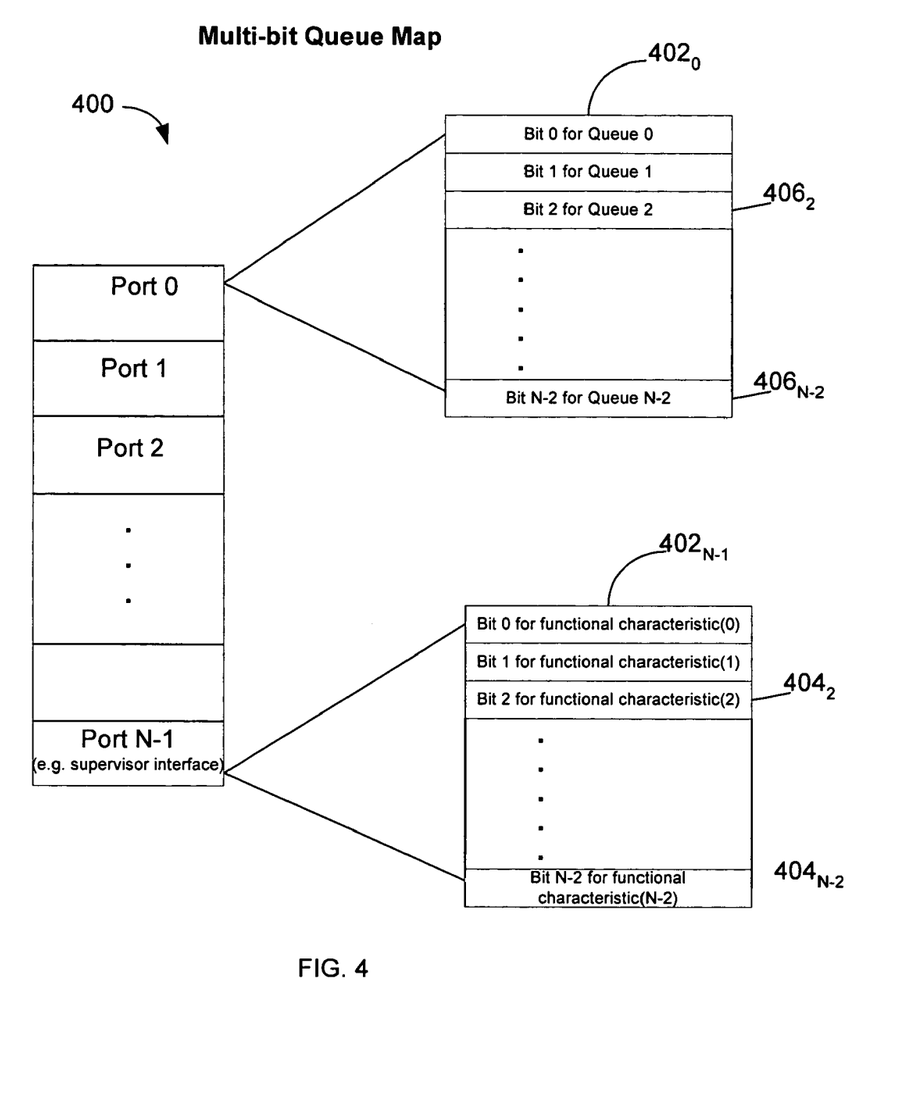
FIG. 4 illustrates a multi-bit queue map for a multi-port switching device in accordance with an embodiment of the present invention.

FIG. 4 illustrates a multi-bit queue map 400 for a multi-port switching device in accordance with an embodiment of the present invention. For each port, there is a group $402_0$, $402_{N-1}$ of bits for the port. In the illustrated example, each bit represents a queue $406_2$, $406_{N-2}$ for a port unit $206_N$ or a functional characteristic $404_2$, $404_{N-2}$ for the supervisor processor 102 in the case of the supervisor interface port 208. Of course other numbers of bits or combinations of bits may be used to identify queues or functional characteristics or other characteristics in combination with either or both.

For example, in the eight port examples of FIGS. 1 and 2 with the additional example of eight queues for each of the Ethernet ports and one supervisor port, a 72-bit queue map is returned. In this example of an eight-port switch, the destination queue map is a 72-bit vector consisting of nine groups of eight bits. Each of the nine groups corresponds to a single port (eight Ethernet ports and one supervisor port). The eight bits within each group represent eight queues with varying priorities or, in the case of the supervisor interface 208, functional characteristics. The destination queue map is included in an internal header which is prepended, for example, by the lookup controller 308 in the port unit $206_N$ case, to each received packet prior to transmission onto the packet transport TDM ring (e.g. 204). The supervisor processor 102 would prepend the queue map to the start cell of a packet it sends to the supervisor interface 208.

The external interface 310 is also communicatively coupled to the transmit buffer 304 for retrieval of an egress packet from the head of an appropriate queue for transmission across an interface, in this example a XAUI physical interface. The transmit buffer 304, in this example, incorporates a transmit buffer manager 312 which provides services such as queue management and buffer space allocation. In other embodiments, the transmit buffer manager 312 may be a separate unit. The packet TDM controller 302 copies packets received from the ring whose queue map indicates that the current port unit is a valid destination into the transmit buffer 304. In one example, the transmit buffer 304 provides for the storage of 128K bytes of packet data. In this example, the transmit packet buffer 304 features a plurality of prioritized packet queues. One implementation example for the queues of the transmit buffer 304 and for the receive buffer's 306 storage of cells is a first-in-first-out (FIFO) memory buffer.

Each of the transmit buffer 304 and the receive buffer 306 is communicatively coupled to the packet transport TDM controller 302 which is communicatively coupled to the TDM ring for sending an ingress packet from the receive buffer 306 onto the ring configuration and retrieving one or more cells of a packet from the ring having the port as a destination for egress from the device as indicated by the destination queue map in the first cell or designated start cell of the packet. Each cell that traverses the switching device has a cell header including a packet position indicator such as a start of packet (SOP) indicator, an end of packet (EOP) indicator, a middle of the packet indicator, the payload bytes of the cell, and its packet source. Another cell of a packet being stored in the transmit buffer can be identified in one example by its packet position indicator and its packet source so that it can be retrieved. In another embodiment, each cell's header includes the multi-bit destination queue map as well.

In one embodiment, the supervisor interface port 208 may also comprise a transmit buffer 304, transmit buffer manager 312, a receive buffer 306, and a packet transport TDM Ring controller 302. In the embodiment of FIG. 2, the supervisor interface receives the destination queue map from the supervisor processor (e.g., 102). In the case of the supervisor interface port, the packets are for control purposes (e.g. proper operation of the switch) as opposed to data switching between networks for example. Sufficient memory for the packet based on the length in the internal packet may be set aside in a transmit buffer as well or passed through to the supervisor processor 102 one cell at a time with a bit set in the header of each of the cells identifying the desired functional characteristic associated with the packet in the queue map. Alternatively, the supervisor interface may have a plurality of queues, one for each functional characteristic identified in the queue map which in turn may also be prioritized. The supervisor processor 102 retrieves the packet from the appropriate queue. Similarly, the supervisor interface may also have a receive buffer 306 for receiving a packet with an internal header including its destination queue map from the supervisor processor 102. The supervisor interface 208 may also include a receive buffer similar to the receive buffer 306 of a port unit $206_N$ to which are fed cells of an ingress packet for forwarding from the supervisor processor 102.

Figure 5:
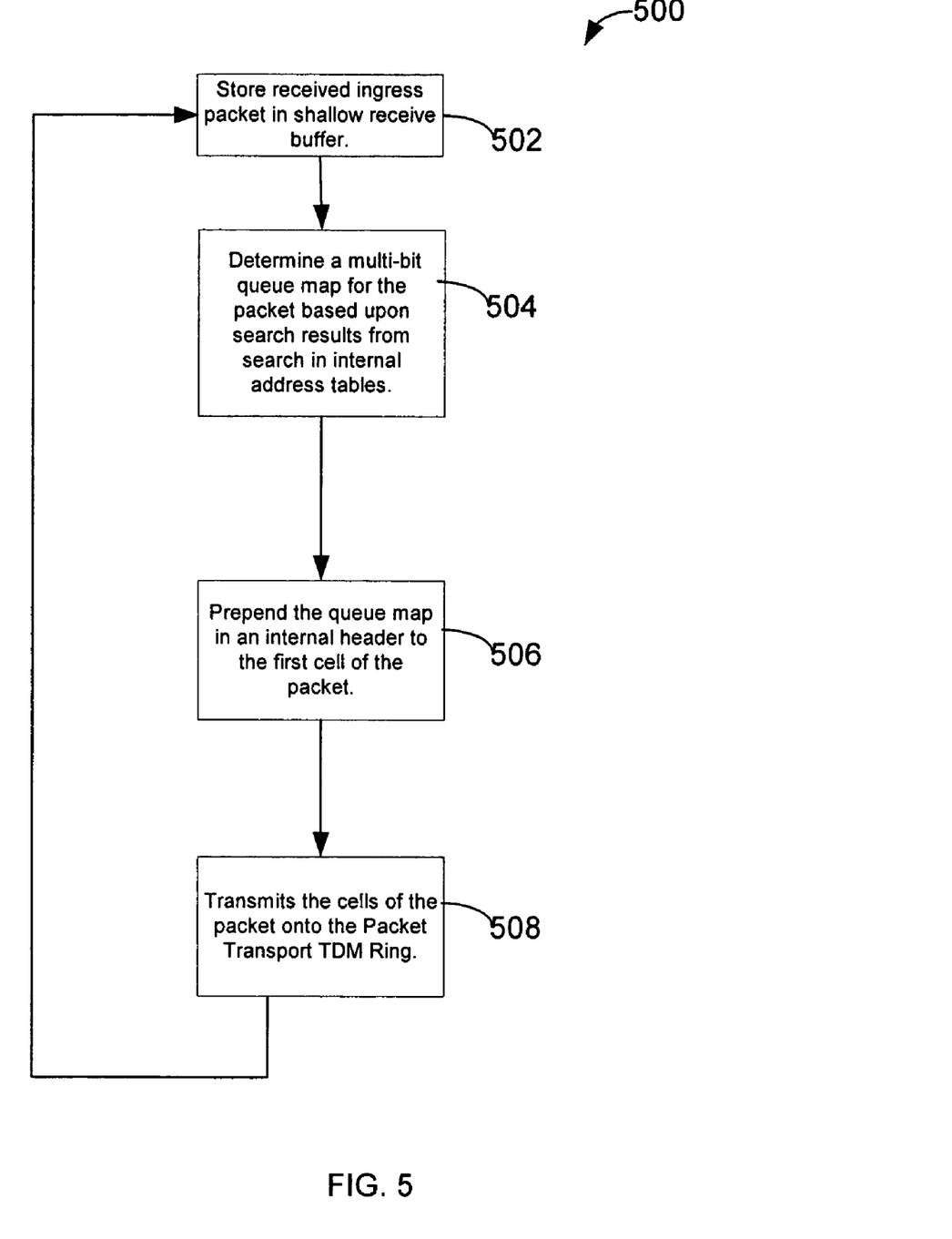
FIG. 5 illustrates a method for processing an ingress packet to a multi-port switching device in accordance with an embodiment of the present invention.

FIG. 5 illustrates a method for processing an ingress packet to a multi-port switching device in accordance with an embodiment of the present invention. For illustrative purposes, the method 500 is discussed in the context of the port unit embodiment $206_N$ of FIG. 3, the architecture of FIG. 2 and the single-chip system environment of FIG. 1. A packet for ingress into the TDM configuration (e.g. ring 204) is received 502 into receive buffer 306. Based on search parameters or arguments extracted by the lookup controller 308 from an ingress packet's header information stored in the receive buffer 306, the look-up address module 202 determines 504 a multi-bit destination queue map for the packet. For example, based on a search parameter such as destination address alone or in addition to a priority indicator, the look-up address module 202 sets the bit corresponding to a queue in the group of bits of the destination port selected based on the destination address. The lookup controller 308 prepends 506 an internal header including the queue map and packet information such as the packet length in a first or start cell of the packet. The TDM controller 302 transmits 508 the cells of the packet onto the ring via the time slots accessible by that port. As discussed in the example above, each port may be provided with dedicated access time slots (e.g. during system initialization) in which a single cell at a time may be deposited and carried to its destination. Fixed time slots cut down on decision-making by the port and provide faster processing. However, dynamic allocation of time slots to ports may also be used. Similarly, based on cell size of the number of time slots available, the amount of cells deposited on the ring at one time may be varied. The method embodiment of FIG. 5 may then be repeated for another ingress packet.

Figure 6:
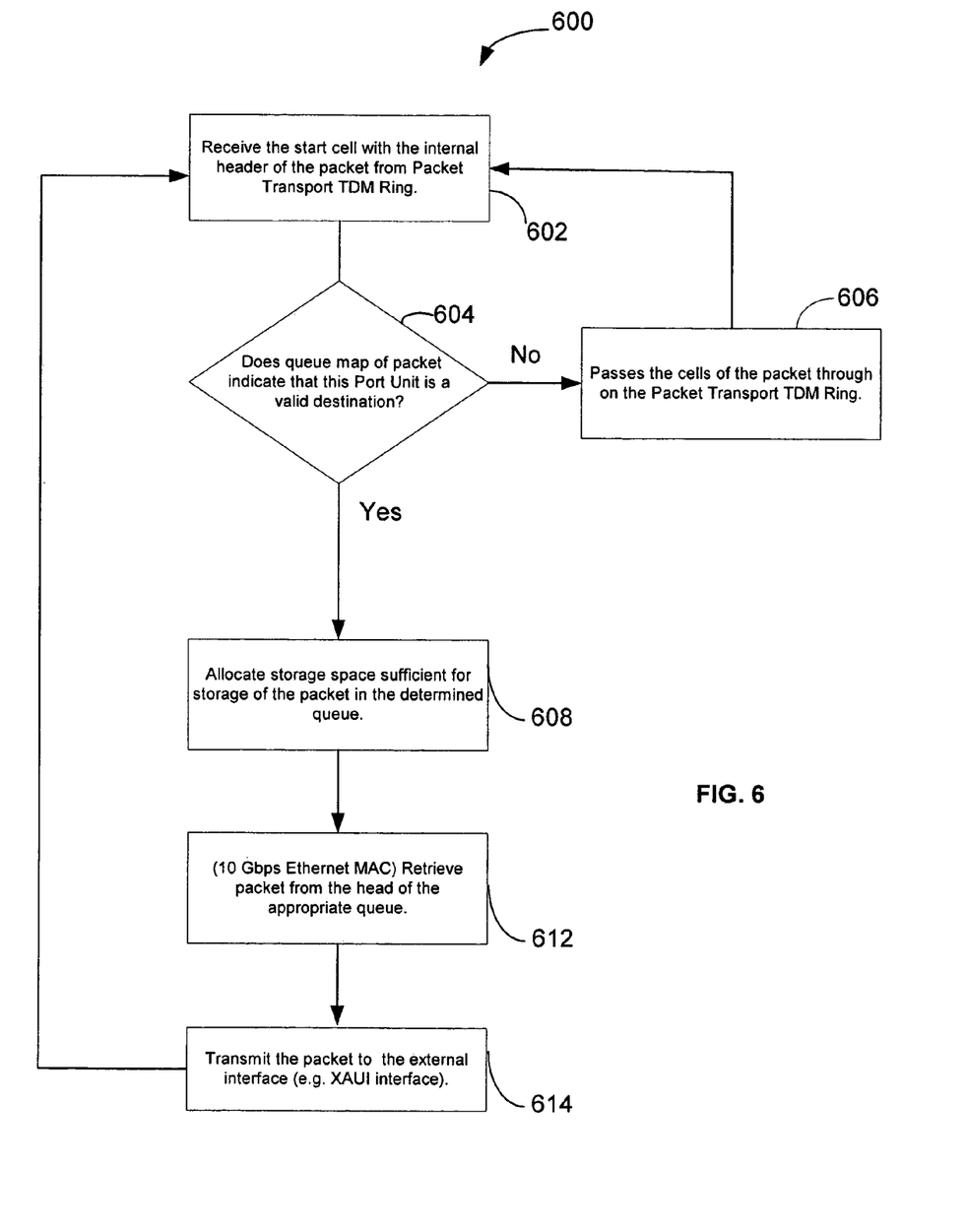
FIG. 6 illustrates a method for processing an egress packet of a multi-port switching device in accordance with an embodiment of the present invention.

FIG. 6 illustrates a method 600 for processing an egress packet of a multi-port switching device in accordance with an embodiment of the present invention. For illustrative purposes, the method 600 is discussed in the context of the port unit embodiment $206_N$ of FIG. 3, the architecture of FIG. 2 and the single-chip system environment of FIG. 1. The packet transport TDM configuration controller 302 receives 602 the first or start cell of a packet carrying the internal header. The controller 302 determines 604 if the queue map indicates that this port unit is a valid destination for this packet. For example, the controller 302 checks whether a bit in the group of bits dedicated to this port is set or not. Responsive to the port not being a valid destination, the controller 302, passes 606 the cells of this packet through on the packet transport TDM ring. Responsive to the cell being destined for the port, based on the packet length in the internal header, the transmit buffer manager 312 allocates 608 storage space sufficient for the storage of the packet in the identified queue.

The external device interface such as the 10 Gbps Ethernet MAC interface 310 retrieves 612 the packet from its queue when the packet reaches the head of the queue. The transmit portion of the 10 Gbps Ethernet MAC interface transmits 614 the packet to the external interface (XAUI interface) and the process repeats for a subsequent packet destined for the port.

It is possible and quite reasonable that multiple ports (e.g. $206_0$ to $206_7$, 208) receiving packets into the switch may direct packets at a single port for egress transmission from the switching device. Since packets are conveyed across the packet transport TDM ring 204 one cell at a time and long packets require multiple cells, it is possible and, again, quite reasonable to expect these cells to arrive from the several receive ports at the transmit port in a shuffled manner. For any single receive port/transmit port pair, the cells are delivered in order. However, between any two cells communicated between the elements of this pair, a number of cells from other receive ports may be inserted as a natural consequence of the operation of the TDM ring. Hence, in one example, the transmit buffer manager 312 maintains multiple open packet "contexts" simultaneously; that is one for each possible source of packet data for each queue.

Figure 7:
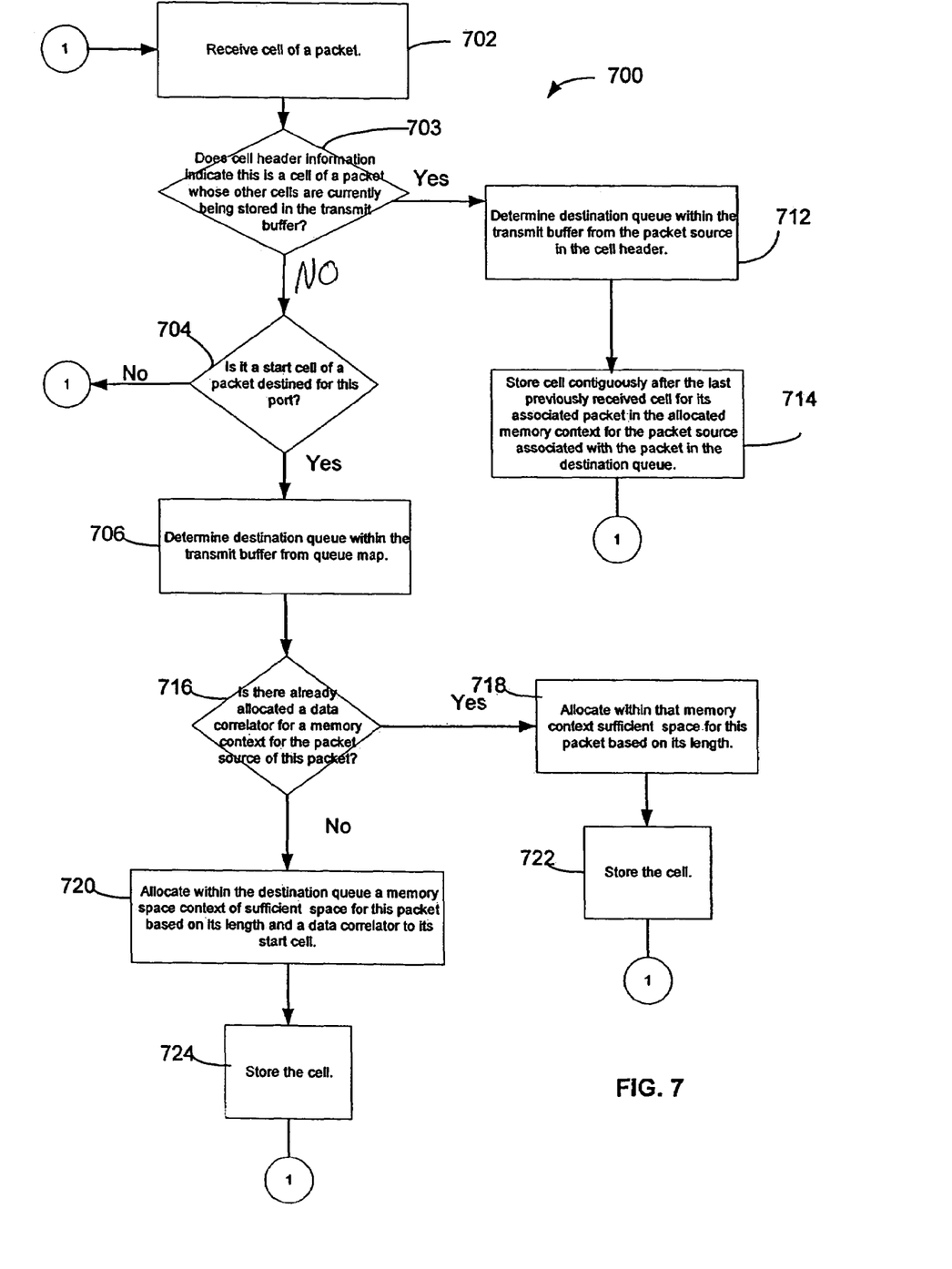
FIG. 7 illustrates a method for storing one or more cells of an egress packet in a multi-port switching device in accordance with an embodiment of the present invention.

FIG. 7 illustrates a method 700 for storing one or more cells of an egress packet in a multi-port switching device in accordance with an embodiment of the present invention. The embodiment of FIG. 7 is described in the context of the port unit of FIG. 3 for illustrative purposes. The TDM controller 302 receives 702 a cell of a packet. Based upon cell header information, such as the packet source and the packet position indicator, the controller determines 703 whether this is a cell of a packet whose other cells are currently being stored in the transmit buffer 304. The controller may store an indicator for each packet source from which a packet's start cell has been received by its port but not its end of packet cell. Responsive to the cell being a cell of a packet currently being stored, the transmit buffer manager 312 determines 712 the destination queue within the transmit buffer for this cell based on the packet source in the cell header. The transmit manager 312 stores 714 the cell contiguously after the last previously received cell for its associated packet in the allocated memory context for the packet source associated with the packet in the destination queue. The write pointer for the memory context is incremented for storage of another cell. In one example, if the cell is the end of packet cell, the write pointer for this packet source is pointed to null. Alternatively, each cell header may contain the multi-bit destination queue map which identifies the destination queue by setting its bit. Responsive to the received cell not being associated with a packet currently being stored in the transmit buffer 304, the controller 302 determines 704 if the received cell is a start cell destined for this port. The controller 302 checks if it has an internal header. If it has an internal header, it examines the group of bits associated with this port in the multi-bit destination queue map to determine if the packet is headed for this port. Responsive to the cell not being a start cell or a start cell for a packet destined for this port, the cell passes through the controller 302 with no processing at the port $206_N$. Responsive to it being a start cell of a packet destined for this port, the transmit buffer manager 312 determines 706 the destination queue to store it in the transmit buffer 304 based upon the queue map bit set. The transmit buffer manager 312 determines 716 if there is already a data correlator such as a write pointer allocated for a memory space context for the packet source of this packet. The data correlator or pointer associates the packet with the packet source from which it came. If so, the manager 312 allocates 718 sufficient space for this packet based on its length within that memory space context contigously after the space for the previously received packet for this packet source in the context, and stores 722 the cell in this space and increments the write pointer to point to the next contiguous memory location for storing a cell in the memory context. Responsive to a data correlator for this packet source not already existing for this queue or pointing to null, the manager 312 allocates 720 within the destination queue a memory space context of sufficient space for this packet based on its length and allocates a data correlator such as a write pointer for this memory context where is stored 724 the start cell received. The write pointer is then incremented to point to the next contiguous memory location for storing a cell in the memory context. The processing continues for other cells received 702.

In another embodiment, there may be a data correlator or write pointer established for each of the other packet sources for the entire transmit buffer as opposed to for each queue. For example, at port unit $206_5$, there would be a write pointer for packet source $206_2$ pointing to a memory context in Queue 0 of $206_5$. Once that packet was completely stored, another packet from $206_2$ but for Queue 3 arrives. A memory context for packet source $206_2$ is now established in Queue 3 and is pointed to by the same write pointer for packet source $206_2$. This cuts down on the amount of pointers to be maintained by the transmit buffer manager 312.

In these examples, the transmit manager maintains a data correlation structure for tracking the respective contexts associated with each of packet sources data received. The data correlation structure may be a linked list of pointers for example.

The contiguous storage of cells of about equal size allows for faster retrieval than if the cells are stored in a scattered manner. Furthermore, in this example, contiguous storage includes wrap-around from the end of the queue to the beginning of the queue. For example, one may use modulo arithmetic with a queue index to accomplish wrap-around in the storage of cells. This memory allocation method embodiment results in eight write pointers (one for each packet source) and a single read pointer for each queue in the embodiment of FIG. 2. The read pointer points to the data currently being retrieved by the external device interface, illustrated in FIG. 2 as a 10 Gbps Ethernet MAC interface. The memory allocation scheme of the transmit buffer memory 304 allows for reassembling multiple packets simultaneously with the transmit buffer memory 304.

Each of the buffers may be implemented as memory first-in-first-out (FIFO) chips. The logic in each of the units such as the logic for extracting packet search parameters in the lookup controller 308 or the logic for correlating the search parameters with address information in the lookup address module 202, that in the packet transport TDM controller 302, the transmit buffer manager 312 or that associated with the transmit portion 314 or receive portion 316 of the external device interface or the logic in the supervisor interface 208 may be implemented in a variety of ways including in a application specific integrated circuit (ASIC), a programmable logic device (PLD) or a software program executed on a central processing unit (CPU).

Figure 8:
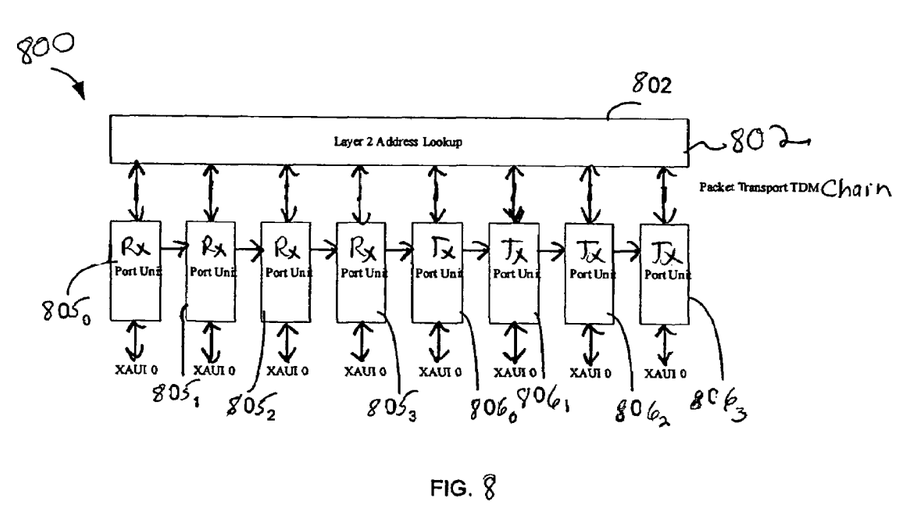
FIG. 8 illustrates another architecture of a multi-port switching device using a linear chain configuration in accordance with an embodiment of the present invention.

FIG. 8 illustrates another architecture 800 of a multi-port switching device using a linear chain configuration in accordance with an embodiment of the present invention. In this embodiment, a packet transport TDM configuration of a linear chain is used instead of a ring. As in FIG. 2, each of the port units $805_0$-$805_3$, $806_0$-$806_3$ is communicatively coupled to an address lookup layer 802 illustrated here as a Layer 2 address lookup module. Similarly, each of the port units $805_0$-$805_3$, $806_0$-$806_3$ may be communicatively coupled to a supervisor interface (e.g. 208). In this example, the port units are coupled in the configuration with receiver port units $805_0$-$805_3$ transferring their ingress packets downstream in the chain to transmitter port units $806_0$-$806_3$. Unlike in the ring where once a cell returns to its packet source, it is stripped from the ring, a cell is stripped at the end of the last transmitter port unit $806_3$.

Figure 9A:
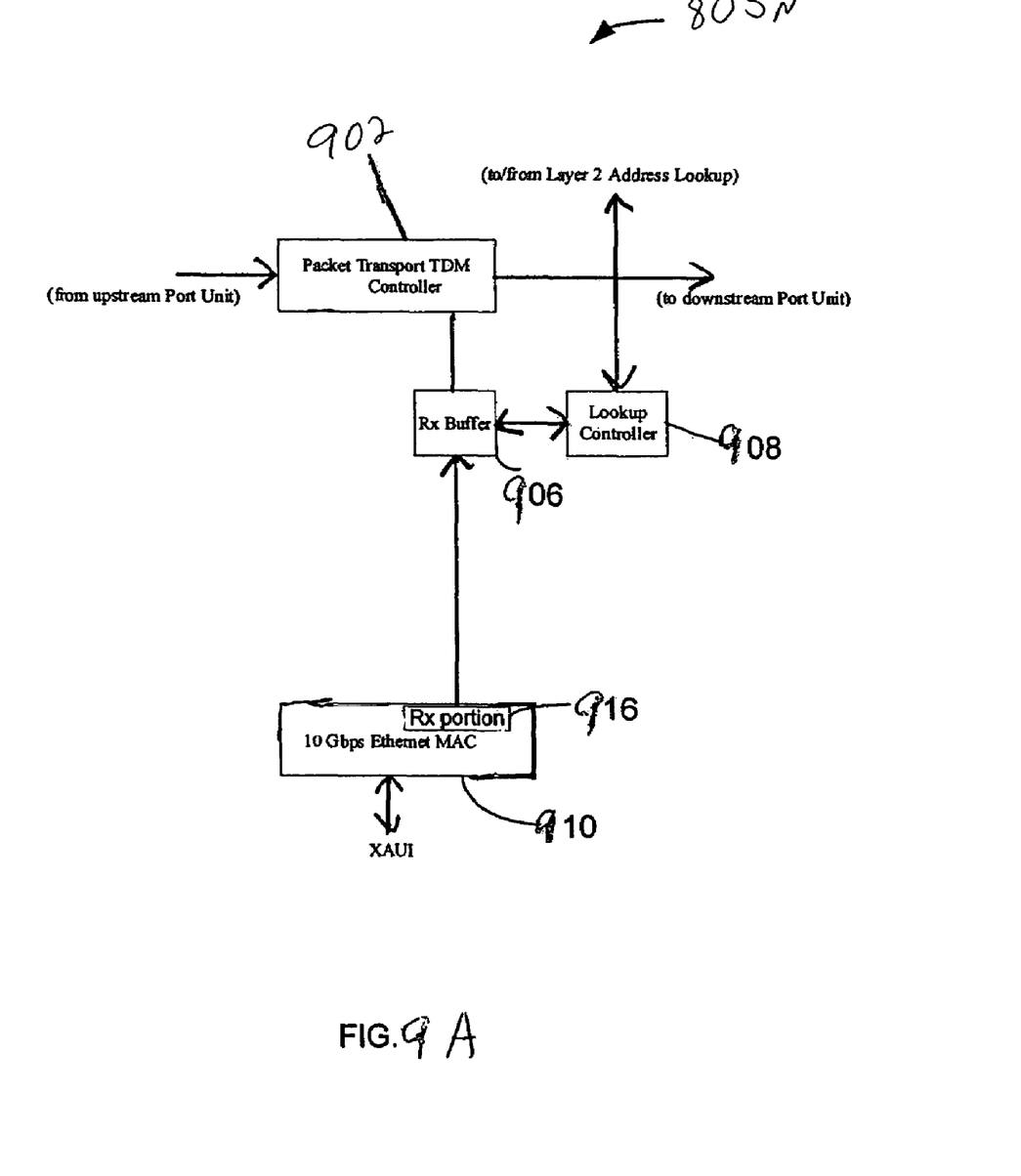
FIG. 9A illustrates a receiver port unit of a multi-port switching device in accordance with an embodiment of the present invention.

FIG. 9A illustrates a receiver port unit $805_0$ of a multi-port switching device in accordance with an embodiment of the present invention that may be used in the embodiment illustrated in FIG. 8. It contains similar elements for receiving an ingress packet as those of port unit $206_N$ illustrated in FIG. 3. It comprises the receive portion 916 of an external device interface 910 such as a 10 Gbps Ethernet MAC for formatting an ingress packet into cells, a receive buffer 906 with similar characteristics as receive buffer 306, a lookup controller 908 for extracting the search parameters and prepending an internal header much like lookup controller 308, and a packet transport TDM controller for receiving data from an upstream receiver unit (e.g. $805_0$) and sending the data down the chain another receiver unit or a transmitter port unit $806_N$.

Figure 9B:
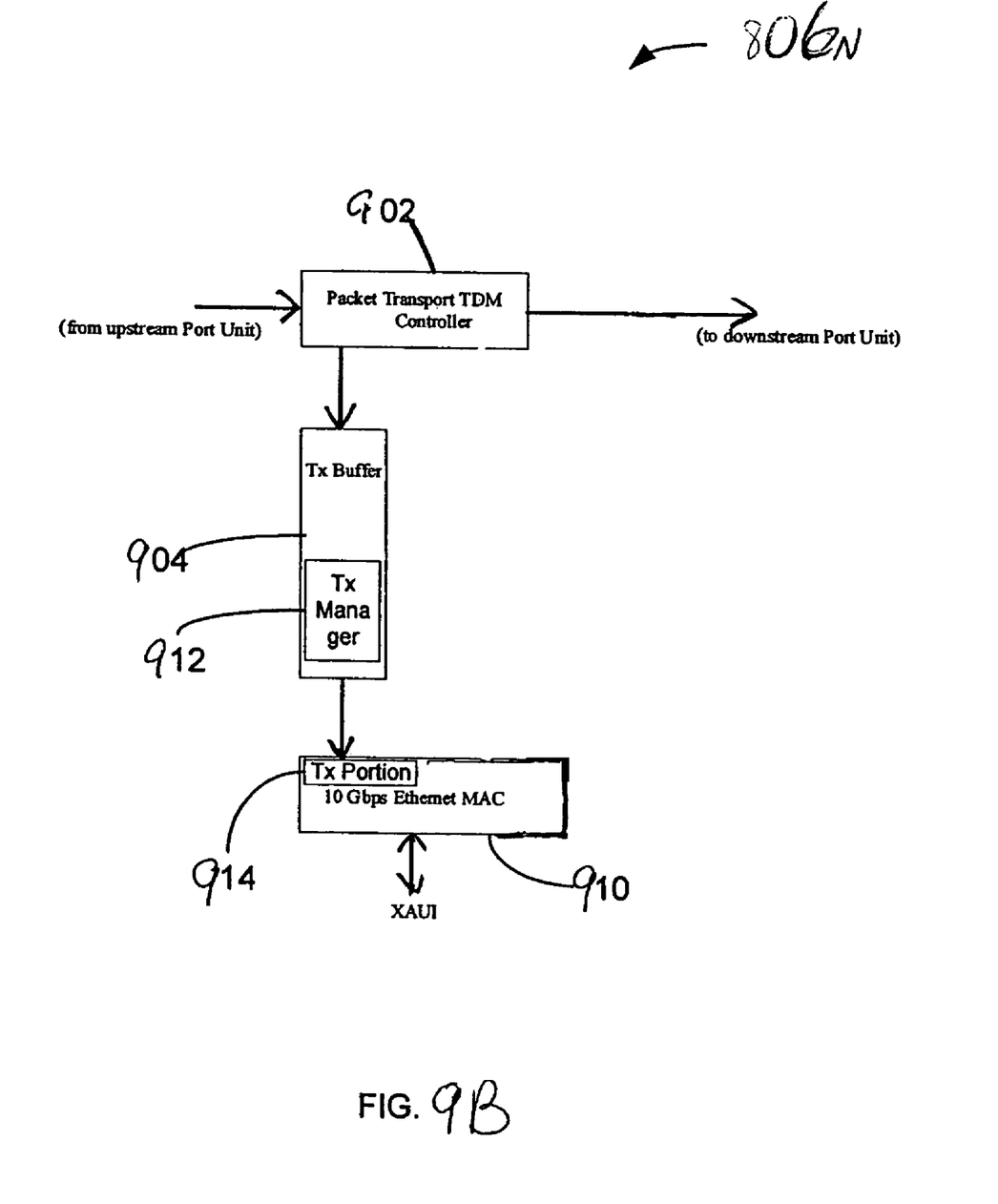
FIG. 9B illustrates a transmitter port unit of a multi-port switching device in accordance with an embodiment of the present invention.

FIG. 9B illustrates a transmitter port unit $806_N$ of a multi-port switching device in accordance with an embodiment of the present invention that may be used in the embodiment illustrated in FIG. 8. It contains similar elements for transmitting an egress packet as those of port unit $206_N$ illustrated in FIG. 3. It comprises a packet transport TDM controller 902 for receiving data from an upstream transmitter $806_N$ or receiver unit (e.g. $805_0$) and sending the data not destined for it down the chain to another transmitter port unit $806_N$ or dropping it, a transmit buffer with a transmit manager 312 communicatively coupled to the controller 902 with similar characteristics and logic for performing the same functionality as transmit buffer 302 and transmit buffer manager 312 in FIG. 3. The transmit buffer 904 is communicatively coupled like buffer 304 to a transmit portion 916 of an external device interface 910 such as a 10 Gbps Ethernet MAC. By separating the receiver and transmitter units in this chain configuration, the functionality as described above for the ring embodiment is performed but with a reduction in components in the same number of port units. Additionally, each transmit buffer manager maintains data correlators and memory contexts for up to half the number of port units as in the ring configuration embodiment of FIG. 2 using the port units embodiment illustrated in FIG. 3.

It should be understood by those of ordinary skill in the art that these examples have been presented by way of example only, and not limitation. Though the examples herein are described in certain specific examples regarding port counts, bandwidths, storage capacities and the like, it will be apparent to those of ordinary skill in the art in light of the teachings herein that each of these parameters may be readily scaled up or down and still remain consistent with the description. It will be understood by those of ordinary skill in the relevant art that various changes in form and the details of the examples described above may be made without departing from the spirit and scope of the present invention.

What is claimed is:

1. A multi-port packet switching device comprising:
   a plurality of port units communicatively coupled in a packet transport time division multiplexed (TDM) configuration, the packet TDM configuration transporting a packet in one or more cells of about equal size, the one or more cells including a start cell including an internal header; and
   each of the port units being communicatively coupled to an address lookup module and an external device interface, the address lookup module comprising logic for determining a multi-bit destination queue map for the packet, the multi-bit destination queue map including a group of bits for each port unit and each group of bits including at least one bit for each queue in each port unit.

2. The multi-port packet switching device of claim 1 wherein each port unit comprises:
   a packet transport TDM controller for receiving the start cell from the packet TDM configuration and determining if its port is the packet destination for the packet based on the multi-bit destination queue map for the packet;
   a transmit buffer communicatively coupled to the packet transport TDM controller for receiving one or more cells of a packet destined for its port, the transmit buffer comprising a plurality of queues; a transmit buffer manager for controlling storage of the one or more cells in the transmit buffer wherein the transmit buffer manager maintains a context of memory space for each of the other packet sources of the packet transport TDM configuration from which a packet is being stored;

the transmit buffer manager maintaining a write pointer for each of the other packet sources in the configuration;

a receive buffer for receiving one or more cells of an ingress packet;

an external device interface for sending the ingress packet to the receive buffer; and a lookup controller for extracting search parameters from a header of the ingress packet, the lookup controller being communicatively coupled to the address lookup module, the address lookup module determining the destination queue map for the packet based on the search parameters.

3. The multi-port packet switching device of claim 1 wherein the configuration is a ring configuration.

4. The multi-port packet switching device of claim 1 wherein the configuration is a linear chain configuration.

5. The switching device of claim 2 wherein the one or more cells of each packet stored in each context are stored contiguously.

6. The switching device of claim 1 wherein the switching device is an Ethernet switching device.

7. The switching device of claim 1 wherein the switching device is implemented as a single chip.

8. The switching device of claim 4 wherein the switching device is an Ethernet switching device implemented as a single chip wherein the external device interface is an Ethernet media access controller (MAC) having a speed of at least about 10 Gbps.

9. In a multi-port packet switching device comprising a plurality of port units communicatively coupled in a packet transport time division multiplexed (TDM) configuration, the packet TDM configuration transporting a packet in one or more cells of about equal size, the cells including a first cell including a packet header of the packet, the method comprising:

determining a multi-bit queue map for a packet to be sent to the packet TDM configuration wherein the multi-bit queue map includes a group of bits for each port unit in the configuration and each group of bits including at least one bit for each queue in each port unit, wherein the controller accesses the group of bits for its port unit and determines based on the queue bits if the one or more cells of the packet are destined for its port unit;

prepending the queue map as an internal header in the first cell of the packet; and transmitting the one or more cells of the packet onto the packet TDM configuration.

10. The method of claim 9 further comprising:

receiving the first cell of a packet including the multi-bit queue map;

determining the destination queue in a transmit buffer of the port unit based on the multi-bit queue map;

allocating sufficient storage space for the packet in a context of memory space associated with the packet source of the packet in the destination queue based on a size of the packet indicated in the header of the first cell; and storing one or more cells of the packet contiguously in the context of memory space.

* * * * *